(12) United States Patent
Carvajal et al.

(10) Patent No.: US 11,073,847 B2
(45) Date of Patent: Jul. 27, 2021

(54) PATH OPTIMIZATION IN PRODUCTION NETWORK SYSTEMS

(71) Applicant: Landmark Graphics Corporation, Houston, TX (US)

(72) Inventors: Gustavo Carvajal, Katy, TX (US); Maiquel Manuel Querales, Katy, TX (US); Marko Maucec, Englewood, CO (US); Steven P. Knabe, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 449 days.

(21) Appl. No.: 14/902,260

(22) PCT Filed: Mar. 4, 2015

(86) PCT No.: PCT/US2015/018781
§ 371 (c)(1),
(2) Date: Dec. 30, 2015

(87) PCT Pub. No.: WO2016/140665
PCT Pub. Date: Sep. 9, 2016

(65) Prior Publication Data
US 2017/0003694 A1  Jan. 5, 2017

(51) Int. Cl.
*G05D 7/06* (2006.01)
*G06Q 10/04* (2012.01)
(Continued)

(52) U.S. Cl.
CPC ........... *G05D 7/0664* (2013.01); *E21B 43/30* (2013.01); *G05B 19/02* (2013.01);
(Continued)

(58) Field of Classification Search
CPC .. G05D 7/0664; G05B 19/0428; G05B 19/02; G05B 2219/37371; E21B 43/30; G06Q 10/047
(Continued)

(56) References Cited

U.S. PATENT DOCUMENTS 7,062,417 B2 * 6/2006 Kruger .................... G06F 17/18
700/30
7,277,836 B2 * 10/2007 Netemeyer ............ G01V 11/00
703/6
(Continued)

FOREIGN PATENT DOCUMENTS

CN 101827024 A 9/2010
WO WO2013106720 * 7/2013

OTHER PUBLICATIONS

O. Ohtmer, "Nonlinear flow analysis in pipe networks", 1983, International Journal for Numerical Methods in Engineering 19.3, pp. 373-392.*
(Continued)

*Primary Examiner* — Juan C Ochoa

(57) ABSTRACT

In some embodiments, an apparatus and a system, as well as a method and an article, may operate to receive parameters for a first node of a network, the network including a plurality of segments through which an object is to be routed and a plurality of nodes, including the first node, representative of intersections of two or more segments of the plurality of segments; to generate segment lengths for segments between the first node and neighboring nodes to identify a nearest neighboring node with a shortest segment length relative to the first node; and to repeat operations of receiving parameters, generating segment lengths, and identifying nearest neighboring nodes until a route has been identified between a first endpoint and a second endpoint of
(Continued)

the network. Additional apparatus, systems, and methods are disclosed.

20 Claims, 9 Drawing Sheets

(51) Int. Cl.
  *E21B 43/30* (2006.01)
  *G05B 19/02* (2006.01)
  *G05B 19/042* (2006.01)

(52) U.S. Cl.
  CPC ....... *G05B 19/0428* (2013.01); *G06Q 10/047* (2013.01); *G05B 2219/37371* (2013.01)

(58) Field of Classification Search
  USPC .............................................. 703/2, 1, 9, 10
  See application file for complete search history.

(56) References Cited

U.S. PATENT DOCUMENTS

| | | | | |
|---|---|---|---|---|
| 7,584,086 B2* | 9/2009 | Frankel | ................... | E21B 43/00 703/10 |
| 8,234,233 B2* | 7/2012 | Zhou | ........................ | G06N 5/02 706/50 |
| 8,776,895 B2* | 7/2014 | Li | .......................... | E21B 47/00 166/369 |
| 9,466,045 B1* | 10/2016 | Kumar | .................. | G06Q 10/087 |
| 2006/0247902 A1* | 11/2006 | Rourke | ................ | G06F 17/5004 703/1 |
| 2009/0056935 A1 | 3/2009 | Prange et al. | | |
| 2011/0024126 A1 | 2/2011 | Brouwer et al. | | |
| 2014/0039793 A1 | 2/2014 | Querales et al. | | |
| 2014/0172382 A1* | 6/2014 | Andrews | ............. | G06F 17/5009 703/2 |
| 2014/0207430 A1 | 7/2014 | Li et al. | | |
| 2014/0303950 A1* | 10/2014 | Houeto | ................. | G06F 17/509 703/10 |
| 2014/0326449 A1 | 11/2014 | Samuel et al. | | |

OTHER PUBLICATIONS

Valve History, printed Apr. 26, 2018, available at http://www.stoneleigh-eng.com/valvehistory.html, pp. 1-2.*
History of water supply and sanitation, Wikipedia, printed Apr. 26, 2018.*
"International Application Serial No. PCT/US2015/018781, International Search Report dated Nov. 24, 2015", 3 pgs.
"International Application Serial No. PCT/US2015/018781, Written Opinion dated Nov. 24, 2015", 4 pgs.
French Preliminary Search Report and Written Opinion dated Nov. 9, 2017, FR 1650214, 18 pages.

* cited by examiner

PATH OPTIMIZATION IN PRODUCTION NETWORK SYSTEMS

BACKGROUND

Operators use production network systems to implement transport, separation, and storage of fluids produced from hydrocarbon reservoirs. Operators can use various hydrodynamic principles to estimate fluid pressure and volume across the production network system for management of the production network system. However, as the number of wellheads and the length of gathering lines and pipelines increases, it becomes increasingly complex and inefficient to manage daily operations in the production network. Ongoing efforts are directed to helping operators manage production network systems in an economical and effective manner.

DETAILED DESCRIPTION

To address some of the challenges described above, as well as others, apparatus, systems, and methods are described herein to help operators plan for more effective usage of oil and gas production network systems.

Figure 1:
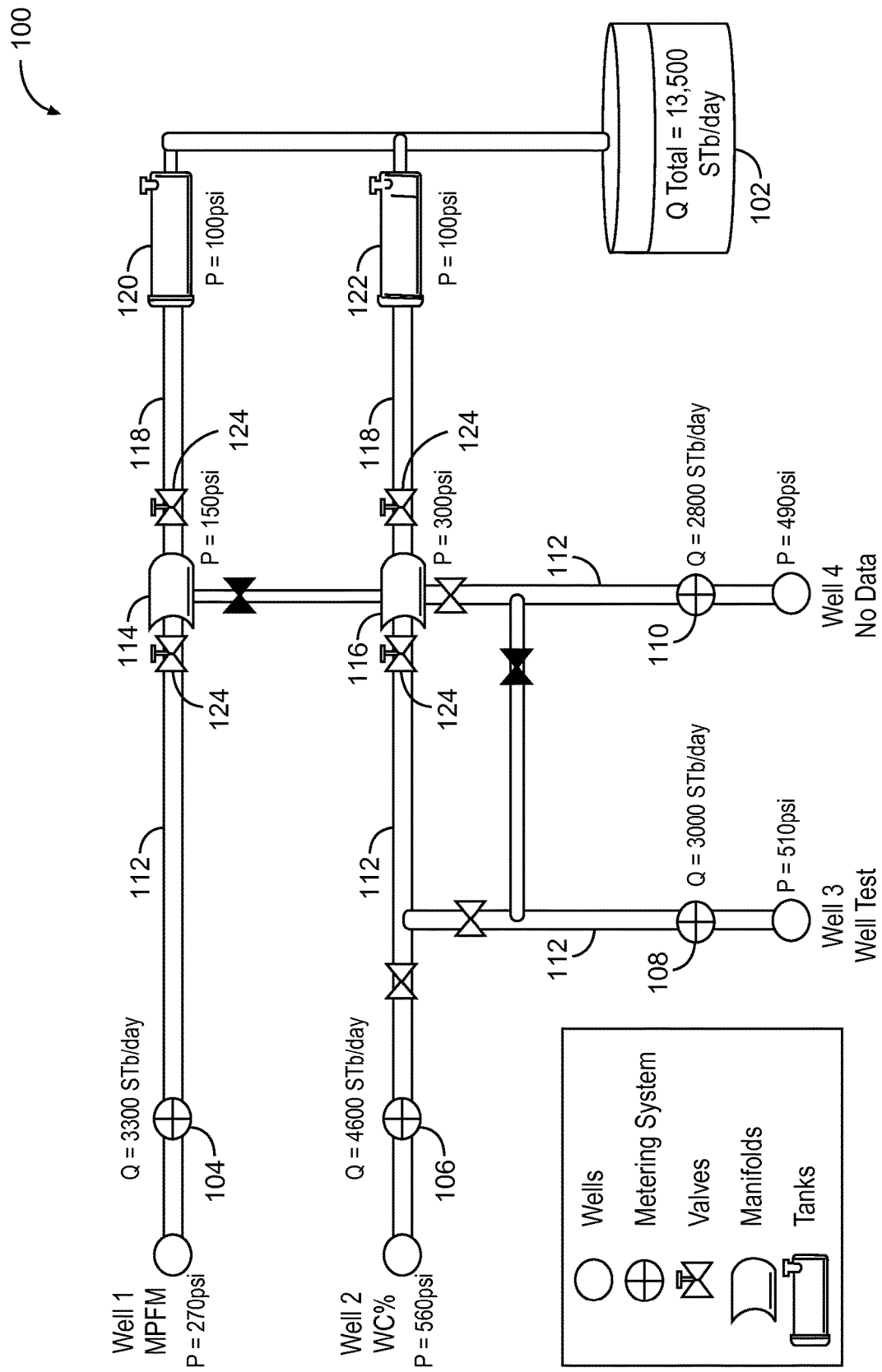
FIG. 1 illustrates components of a surface system in which some embodiments can be implemented.

FIG. 1 illustrates components of a surface system 100 in which some embodiments can be implemented. The illustrated surface system 100 includes four wells, Well 1, Well 2, Well 3, and Well 4, which provide, e.g., hydrocarbon-based fluids that flow through other components of the surface system 100, to end with storing, for example, oil in a tank 102. Each well, e.g., Well 1, Well 2, Well 3, and Well 4, can measure fluids with different instrumentation. For example, Well 1 can use a multiphase flow meter 104 that provides real-time or near-real-time measurements for oil, water, and gas production. A different well, for example Well 2, can use a water cut meter 106 to measure only water flow, wherein difference calculations can be used to calculate oil flow (but not gas flow, for example). Well 3 and Well 4 can use multiphase flow meters, water cut meters, virtual meters, or other meters 108, 110. Any of Well 1, Well 2, Well 3, and Well 4 can provide or use well tests that are performed periodically, for example, monthly. While four wells Well 1, Well 2, Well 3, and Well 4 are illustrated, the surface system 100 can include any number of wells.

Wells provide flows through gathering lines 112 that converge at various points. For example, Well 1, Well 2, Well 3, and Well 4 are shown as converging at manifolds 114, 116. It will be appreciated that any number of manifolds can be used. From these manifolds 114, 116, operators transport fluids through pipelines 118 to separators 120, 122, where the operators may separate gas, oil and water and dispatch the resulting separated components to tank 102, to market, or to other treatment facilities or reinjection facilities.

Oil and gas companies can use available Bernoulli applications and hydrodynamic methods (e.g., multiphase flow correlations) to estimate pressure and volume across the surface system 100 and to match these estimates with measured volumes and pressures from wells, separators, tanks, etc. Operators can use systems for identifying gathering lines 112 or pipelines 118 that may be exhibiting bottlenecks, leaks, high pressure, or reduced flow, among other error conditions. Operators can additionally use flow assurance systems to prevent or detect corrosion or erosion in lines. Some operators can use line identification systems and other diagnostics to identify alternative pathways between wells (e.g., Well 1, Well 2, Well 3 and Well 4) and gathering lines 112 to increase system flows, to provide back allocation from tanks 102 to wellheads to calculate volumes from individual wells, and to identify oil and gas losses across the surface system 100. However, as surface systems 100 link ever-increasing numbers of wells with gathering lines 112 and pipelines 118, it becomes ever more complex to manage the daily operation in hydrocarbon production systems efficiently.

Embodiments provide integrated components for production network management in accordance with various embodiments. By using these various components, systems and methods in accordance with embodiments can compute, model, characterize, diagnose and optimize large production systems.

Figure 2:
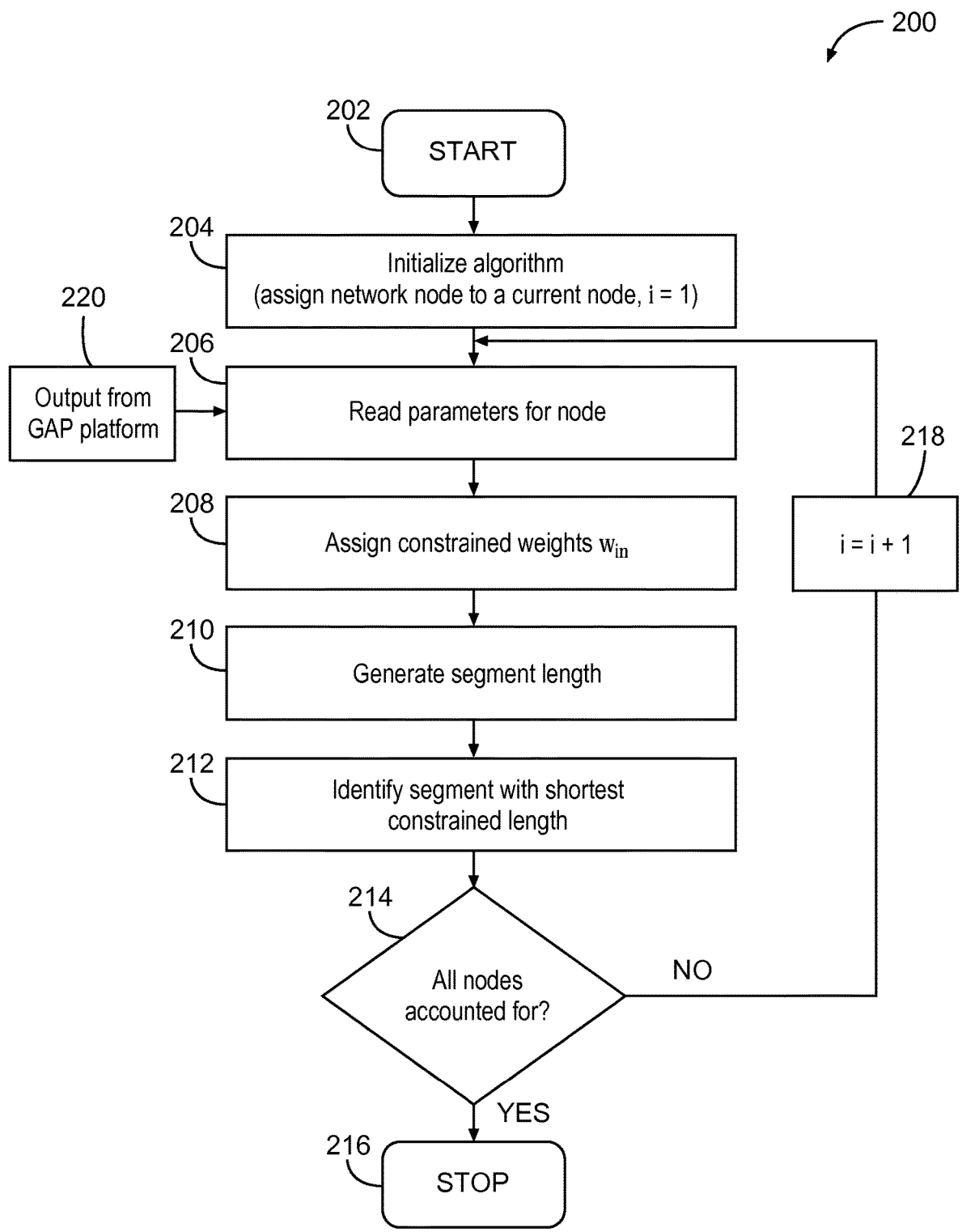
FIG. 2 is a flowchart illustrating a method for network path optimization in accordance with some embodiments.

FIG. 2 is a flowchart illustrating a method 200 for network path optimization in accordance with some embodiments. A processor 920 (FIG. 9), another component of system 900 (FIG. 9), or another system can perform operations of the method 200. In some embodiments, the processor 920 will implement a graph search algorithm, for example Dijkstra's algorithm, to calculate the shortest constrained path in the network, for instance the shortest constrained path for a given well to a separator in a field with multiple wells, manifolds and gathering line segments.

The example method 200 begins at operation 202, when the processor 920 detects a need to increase throughput or when the processor 920 detects that an error condition such as a blockage has occurred in the surface system 100 (FIG. 1). Other example error conditions that can trigger implementation of the example method 200 include a reduced flow rate or a change in flow regime in a segment of the network as measured by symptoms such as vibration. The processor 920 can execute, or a separate processor or other hardware can execute, a notification module (not shown in the Figures) to notify of error conditions and to initiate the example method 200 responsive to detection of the error condition. For example, the notification module can include or be in communication with an audible or visual alarm, and the method 200 can include generating an alarm indication upon detection of the error condition. Furthermore, the notification module can initiate operations of receiving parameters, generating segment lengths, and identifying nearest neighboring nodes to generate an updated route responsive to detection of the error condition.

Under these or other conditions, the processor 920 will conduct operations according to the example method 200 to propose an improved or optimized network path to circumvent the blocked region or other segment that is under an error condition. In other examples, the processor 920 may conduct the operations of the example method 200 periodically, or upon system startup, or upon a manual request from a human or other user, by way of nonlimiting example.

Figure 3:
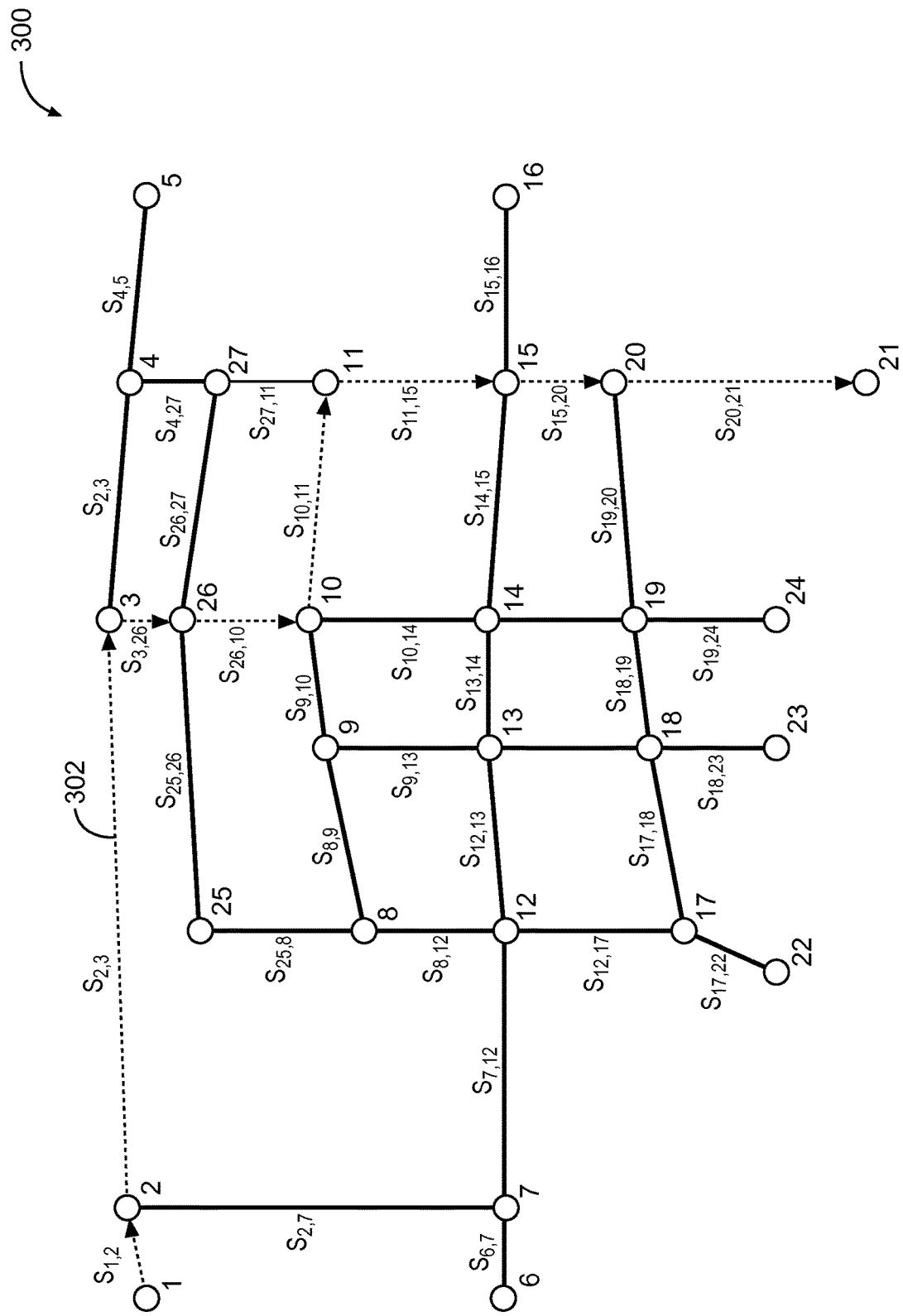
FIG. 3 illustrates an example network model of a production network system with a path therethrough generated by a method for network path optimization in accordance with some embodiments.

Example methods, such as method 200 in accordance with various embodiments, assume a network model (e.g., a pipeline network model) of the surface system 100. FIG. 3 illustrates an example network model 300 of a production network system with a path therethrough generated by a method such as example method 200 for network path optimization in accordance with some embodiments.

As shown in FIG. 3, a network model 300 can be represented in a manner at least somewhat similar to a road network, with a plurality of segments (e.g., segment $s_{1,2}$, segment $s_{2,3}$, etc.) through which an object is to be routed. In accordance with a network model, it will be appreciated that the object being routed (instead of vehicles, people, etc.,) comprises crude oil or natural gas.

For purposes of reference or relational database operations, these segments can be numbered according to the illustration or according to any other numbering system, and identification information for segments can be stored in a database, for example. In accordance with embodiments, these segments are mathematically represented as positive weights. The network nodes are represented as junctions, wherein each segment is associated with a "road interval" between two junctions, such that the nodes are representative of intersections of two or more segments of the plurality of segments. In some embodiments, the nodes can also be mathematically represented as positive weights.

In the network model 300, the mathematical weight of a segment corresponds to the length of the associated segment, the time needed to traverse the segment, and the cost of traversing the segment. The mathematical weight of a node can correspond to how efficiently that node allows passage of, for example, oil and gas. As an illustrative example, the mathematical weight of a node can correspond to whether the node (e.g., a valve) has an obstruction that reduces flow velocity through the node. A weight constraint of a segment or node will take into account various parameters that can be output by available production network modeling platforms. One example of an available production network modeling platform is the GAP platform, available from Petroleum Experts, Inc. of Houston, Tex., although embodiments are not limited to receiving parameters from GAP or from any other particular production network modeling platform.

The network model 300 can also include representations or manifestations of valves, manifolds and other variations not shown in FIG. 3.

Referring again to FIG. 2, the example method 200 continues with operation 204, with the processor 920 initializing the algorithm to begin with a first node, for example node 1 in FIG. 3.

The example method 200 continues with operation 206, with the processor 920 receiving parameters for a first node of a network (e.g., Node 1). The parameters can be constrained (e.g., bounded) although embodiments are not limited thereto. The parameters can include pipe segment parameters or other parameters from the production network modeling platform (e.g., GAP) at 220, including parameters indicating a list of neighboring (or connecting) nodes (hereinafter nodes n) associated with a current node under consideration (hereinafter, node i). Parameters can also include a pressure difference between node i and one or more neighboring node(s) n (hereinafter $\Delta p_{in}$). Other parameters include the flow regime for different segments, wherein the flow regime is defined according to a measured dimensionless Reynolds number $Re_D$ in the corresponding segment. For example, in embodiments, the flow regime of a segment is indicated as laminar flow for a Reynolds number less than 2100, transient flow for a Reynolds number between 2100 and 4000, or turbulent flow for a Reynolds number >4000. However, embodiments are not limited to any particular ranges of Reynolds numbers for defining flow regime, nor are embodiments limited to defining any particular number of flow regimes. For example, other flow regimes as understood by those of ordinary skill in the art can be defined.

The processor 920 can receive any other additional parameters such as length (hereinafter $l_{in}$) and diameter (hereinafter $D_{in}$) of the segments connected to otherwise associated with node i.

The example method 200 continues with operation 208 with the processor 920 generating weights $w_{in}$ for segments between the current node i and one or more neighboring nodes n. The processor 920 can constrain these weights to a range of values although embodiments are not limited thereto. In some embodiments, the processor 920 can generate these weights based on the parameters received in operation 206 using various calculations. For example, in some embodiments, the processor 920 defines weights $w_{in}$ as the least square root (LSQR) norm of constraint parameters received in operation 206 according to Equation (1):

$$w_{in}=\|w_{pi}, w_{Rei}, w_{li}, w_{Di}\| \tag{1}$$

where $w_{pi}$ corresponds to weight constraints associated with a constrained parameter $\Delta p_{in}$, $w_{Rei}$ corresponds to a constrained parameter $Re_D$, $w_{li}$ corresponds to a constrained parameter $l_{in}$, and $w_{Di}$ corresponds to a constrained parameter $D_{in}$.

In other embodiments, the processor 920 may define weights $w_{in}$ with other methods including linear programming simplex method, probabilistic methods, Monte Carlo minimization, Markov chains, etc.

The example method 200 continues with operation 210 with the processor 920 generating segment lengths (e.g., "constraint-weighted segment lengths") for segments between the first node and each neighboring node. These segment lengths can be based on the weights generated according to methods described above.

For example, with reference to FIG. 3, in operation 210, the processor 920 may generate a segment length (or constraint-weighted segment length) for the segment $s_{1,2}$ between Node 1 and neighboring Node 2. In cases where other nodes (not shown in FIG. 3) neighbor Node 1, embodiments may generate segment lengths between Node 1 and each of those neighboring nodes. As described above, in some embodiments the segment lengths can be based on constrained values, although embodiments are not limited thereto, and the segment lengths can therefore in those embodiments be referred to as "constraint-weighted segment lengths." For each neighboring node n, the distance value $d_n$ of the neighboring node n is updated (relative to the actual physical length, without accounting for contained values) to $\tilde{d}_n$ using:

$$\tilde{d}_n = \min\{d_n, d_i + w_{in}\} \tag{2}$$

where $w_{in}$ corresponds to a weight, for example a constrained weight as described earlier herein with respect to operation 206, of the link between nodes and n in the network model 300 (FIG. 3).

The example method 200 continues with operation 212 with the processor 920 identifying a nearest neighboring node with a shortest segment length (e.g., constraint-weighted segment length) relative to the current node i (e.g., between the first node (Node 1) and the neighboring node (Node 2), although the nearest neighboring node could be any other node with a connecting segment to Node 1). The nearest neighboring node will not necessarily be the nearest in terms of geographical distance. On the contrary, the processor 920 identifies the nearest neighboring node with the shortest segment length according by identifying the neighboring node with the smallest weighted or constrained distance according to:

$$\min_{n \in N} d|n_n = d_n^* \tag{3}$$

where N corresponds to the number of all nodes n in the network model 300.

After satisfying a criterion, for example as defined in Equation (3), the node n* is designated as the new current node i for additional processing or iterations. The example method 200 may continue (starting from operation 214) and the search process is iteratively repeated (by first incrementing to the next node i in operation 218) until each node and connecting segment in the network model 300 has been accounted for, at which point the processor 920 stops processing in operation 216. For example, the processor 920 will repeat operation 206 of receiving parameters, generating segment lengths (operation 208), and identifying nearest neighboring nodes n (operations 210 and 212) until a route has been identified between a first endpoint and a second endpoint of the network.

In some example embodiments, the first endpoint comprises a wellhead (e.g., Well 1, Well 2, Well 3 or Well 4 of FIG. 1) and the second endpoint comprises a storage unit (e.g., tank 102 of FIG. 1). In some example embodiments, the processor 920 will have identified the route when segment lengths have been generated based on each node of the plurality of nodes. For example, the route may be considered to have been identified when every node (e.g., every node 1 through node 27) in the illustrated network model 300 is used at least as one of the current node i or a neighboring node n in Equations (1)-(3).

In some embodiments, the processor 920 can provide information regarding shortest constrained segments, routes, error conditions, or other information, to the production network modeling platform 905 (e.g., a GAP system), such that two-way communication occurs between the processor 920 and the production network modeling platform 905.

In the illustrated example of FIG. 3, the processor 920 may iterate through some or all of the above operations to generate the route 302, which represents a least-cost route (e.g., a "shortest path" or "shortest constrained path") between a first endpoint (Node 1) and a second endpoint (Node 21) of the network. In examples, the first endpoint may include a wellhead, and the second endpoint may include a tank as described earlier herein.

Figure 9:
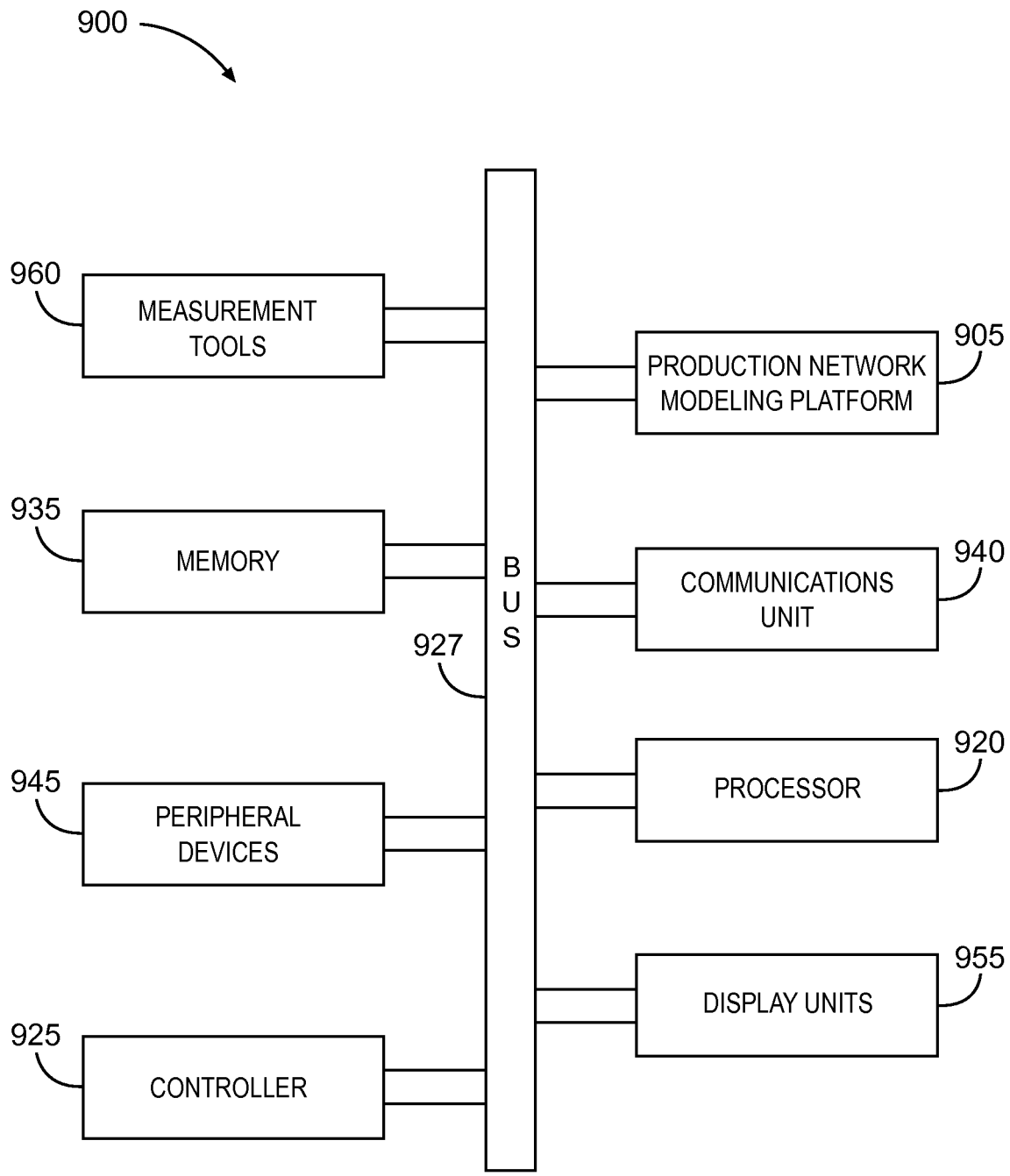
FIG. 9 is a block diagram of a computer system for implementing some embodiments.

The route may be defined, and thereafter stored in memory (e.g., in a relational database or other database in memory 935 of FIG. 9), as a list of nodes. For example, the route 302 shown in FIG. 3 may be stored as identification information of Node 1, Node 2, Node 3, Node 26, Node 10, Node 11, Node 15, Node 20 and Node 21.

The example method 200 can include an operation of generating a visual display of the network (e.g., of the network model 300), wherein the visual display includes a representation of the route 302 or any other routes generated in accordance with embodiments. In some embodiments, particularly in embodiments in which the route 302 of oil or gas is to be changed, the example method 200 can include providing a control signal to control an element of the network based on the recommendation. For example, the processor 920 can provide control signals (or the controller 925 can provide control signals) to control valves 124 within the surface system 100 (FIG. 1).

When executing the example method 200, the processor 920 will assume that segment weights correspond to non-negative values. Accordingly, at least because the pressure difference between corresponding network nodes can have a negative sign, the processor 920 will use an absolute value of such pressure difference for operations of method 200. As an alternative to the Dijkstra algorithm, the processor 920 can find the shortest constrained network path using linear programming in some embodiments. In still other embodiments, the processor 920 will find the shortest constrained network path by solving the Eikonal equation using Fast Marching Methods (FMM), wherein the processor 920 will mimic the network paths using geodesic distances to solve the problem between two points in terms of topographical distance and time.

Figure 4:
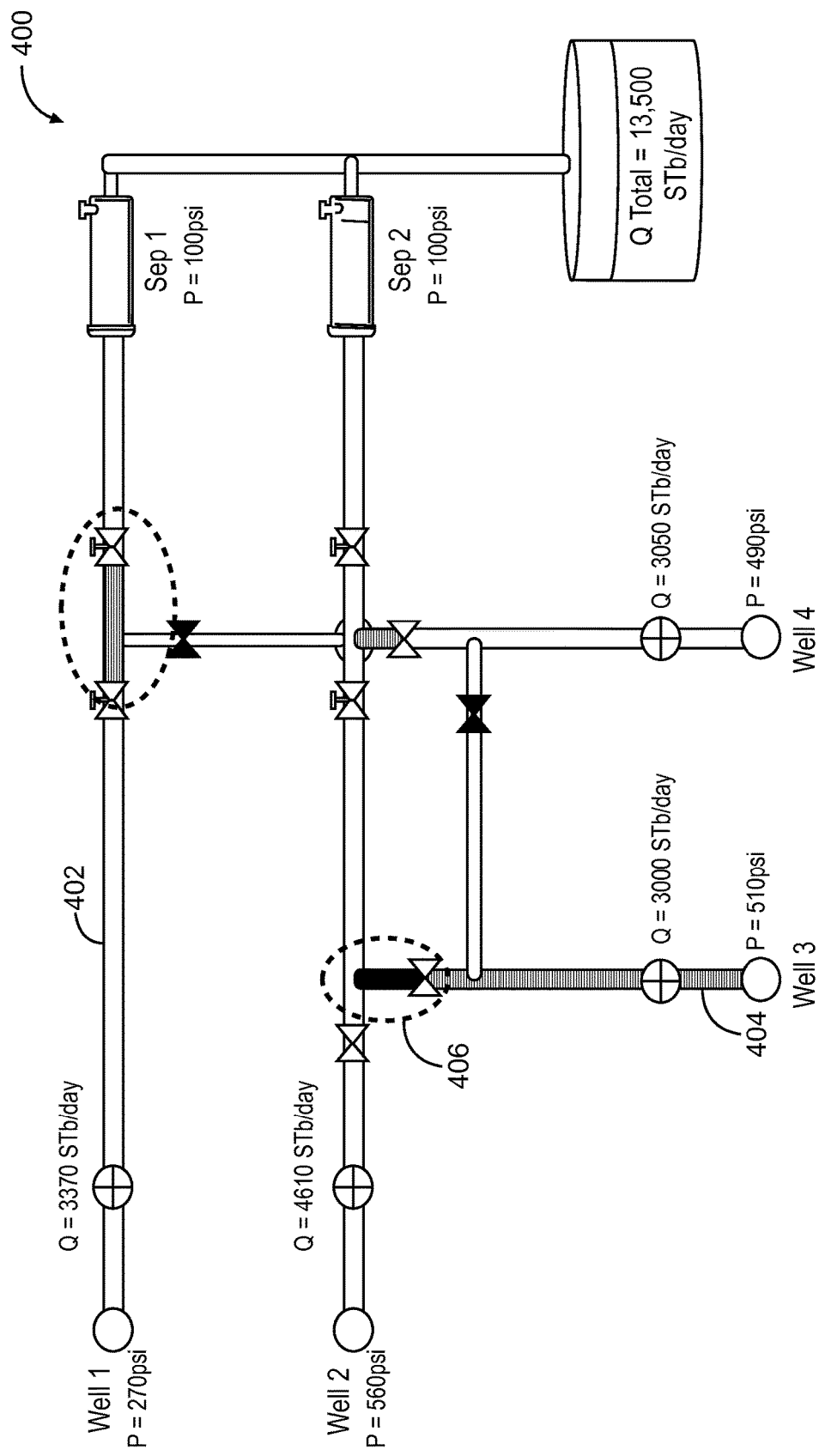
FIG. 4 is an illustration of a traffic map that can be generated to illustrate chaotic flow and chaotic flow junctions in accordance with some embodiments.

FIG. 4 is an illustration of a traffic map 400 that can be generated to illustrate chaotic flow and chaotic flow junctions in accordance with some embodiments.

The processor 920 can provide a graphical user interface (GUI) on a display unit 955 (FIG. 9) that includes GUI elements to allow operators to visualize the surface system 100 using traffic light color codes (illustrated with shaded segments in FIG. 4) to show locations in which lines flow optimally, locations in which lines are not flowing at all, and locations in which lines are flowing hut with certain error conditions. The GUI can be interactive to allow a human operator or other operator to manipulate components of the traffic map 400. In some embodiments, the processor 920 can use a history-matching method performed against field measurements, and the traffic map 400 will show unexpected behavior.

The traffic map 400 can show, in real time or near real-time, paths and flow that have been modeled using fluid dynamics. FIG. 4 shows pathways 402 to indicate fluid flow with normal perturbation. Well 3 exhibits an interval 404 and 406 indicating a transition zone with turbulent flow due to reduced pipe diameter or junction with another line. The traffic map 400 can connect to or be used in conjunction with any real-time surveillance systems used by an operator of a production network.

Figure 5:
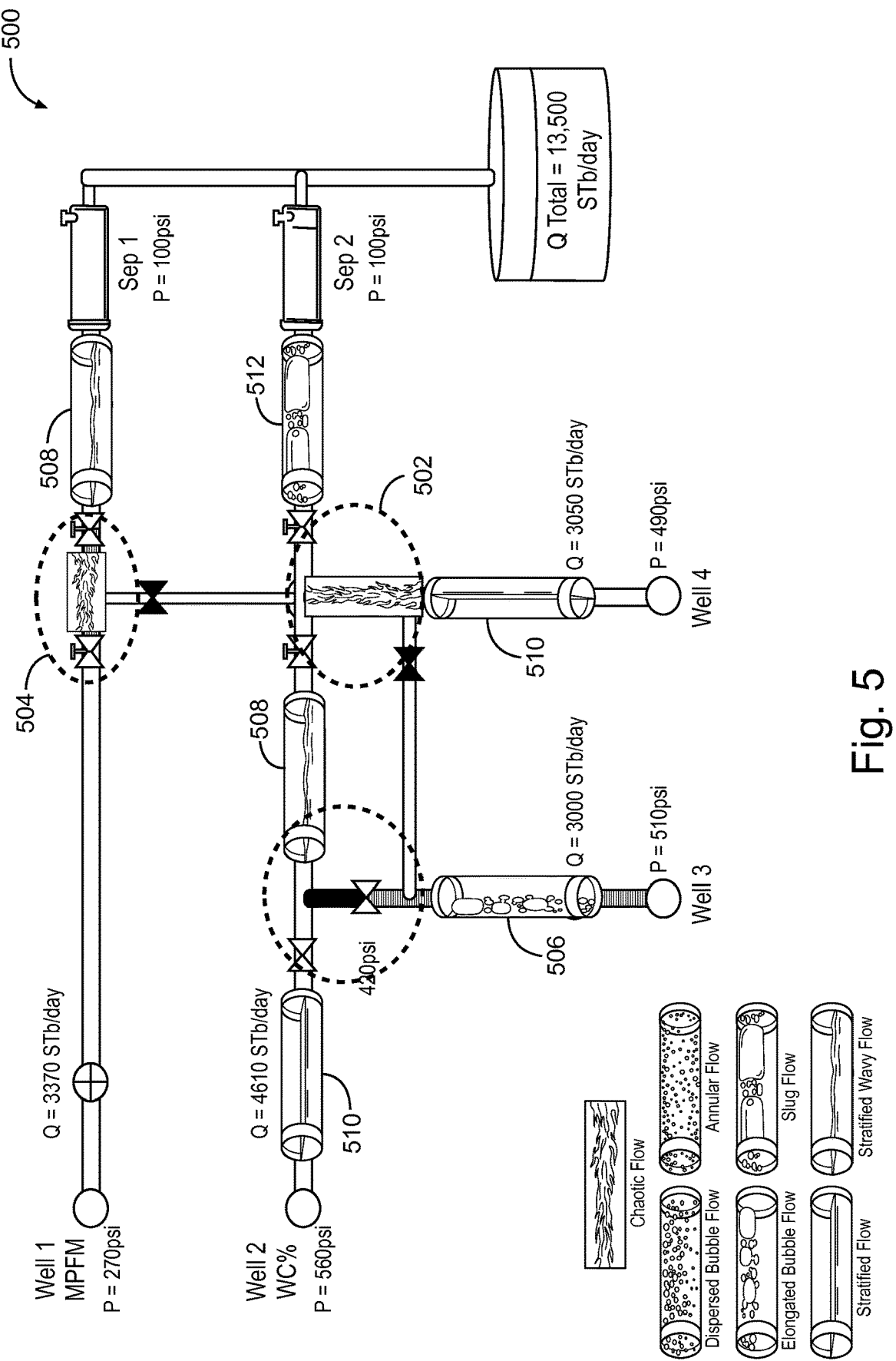
FIG. 5 illustrates a flow regime map representing flow regimes determined within segments in a surface system in accordance with various embodiments.

FIG. 5 illustrates a flow regime map 500 representing flow regimes determined within segments in a surface system in accordance with various embodiments. Based on physical models, different flow regimes will be calculated to enable estimates of fluid velocity and pressure profiles across the entire system. The processor 920 can use these flow regimes to identify areas with turbulent or chaotic flow that generate high vibrations, corrosion, erosion, etc. The processor 920 can receive flow regime information as described earlier herein with reference to operation 206 (FIG. 2). In some embodiments, flow regimes can be displayed on a GUI in dynamic form (e.g., in interactive time-dependent form, in continuous sequence or time-lapse intervals) using the superficial fluid velocity methodology, which calculates the hypothetical flow velocity under the assumption that the given phase of fluid is the only present phase in the observed system. Using a display such as that shown in FIG. 5, operators can visually identify bottlenecked areas. Based on such identification, whether visual or otherwise, operators, the processor 920, or another process or device can trigger a method such as example method 200 (FIG. 2) to circumvent bottlenecked areas.

FIG. 5 illustrates seven flow regimes, although embodiments are not limited thereto and any number or identity of flow regimes can be used. For example, a chaotic flow regime can exist at segments 502 and 504. Elongated bubble flow can exist at segment 506. Stratified wavy flow can exist at segments 508, and stratified flow can exist at segments 510. Slug flow can exist at segment 512. While various identifiers, e.g., "chaotic," dispersed bubble," "annular," "elongated bubble," "slug," "stratified," and stratified wavy" have been used to describe various flow regimes, it will be understood that other identifiers or adjectives can be used in accordance with any hydrocarbon production practice or standard usage. The flow regimes types illustrated in FIG. 5, and other flow regime types, can be determined by the processor 920, by GAP, or by other systems based on the superficial velocity of gas and liquid in a pipe network system of multiphase flow.

Figure 6:
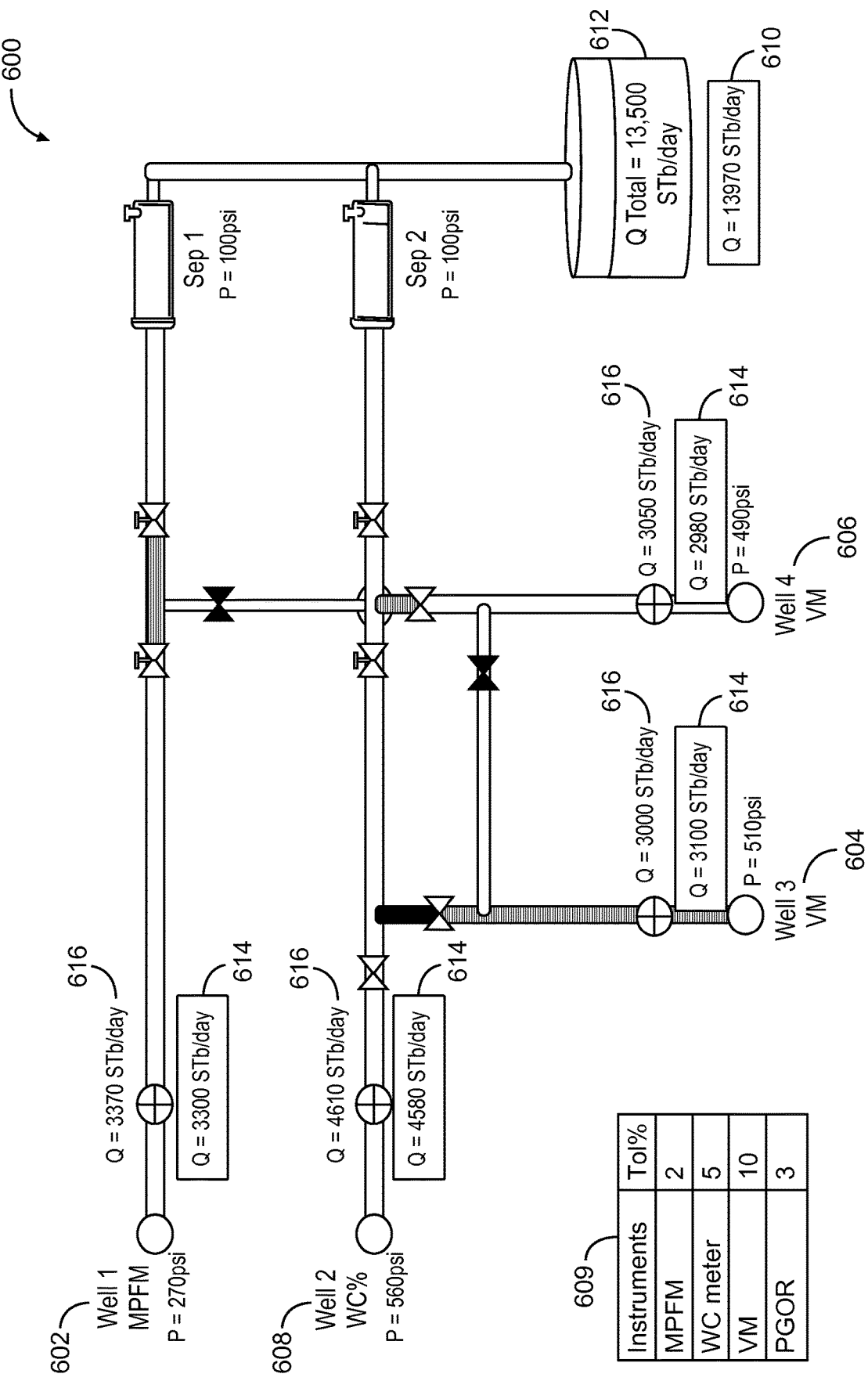
FIG. 6 illustrates fluid balance in a production network subsequent to data reconciliation in accordance with various embodiments.

In some embodiments, the processor 920 can perform data reconciliation of measurement data to help data fit into constraints for use in other algorithms, for example in algorithms executing during network path optimization as described above with reference to method 200. FIG. 6 illustrates fluid balance in a production network 600 subsequent to data reconciliation in accordance with various embodiments.

In some embodiments, the processor 920 can use real time data from well-head, separator, manifolds and tanks to reconcile the entire production network 600 to correct measurement errors (whether random or systematic) and to provide virtual metering. The processor 920 can perform such reconciliation using a reconciliation model, which can be represented as a nonlinear system of equations F(y)=0, where $y=(y=y_1 \ldots y_n)$) is a measurement vector of n measured variables, and wherein y represents a measured fluid flow with conservation of mass as a constrained objective. Given the measurement vector y the data reconciliation is expressed as an optimization problem, subject to F(y)=0:

$$\min_{y^*} \sum_{i=1}^{n} \left(\frac{y_i^* - y_i}{\sigma_i}\right)^2 \quad (4)$$

where $y_i^*$ is a reconciled value and $\sigma_i$ is a standard deviation of i-th measurement, and wherein $y_{min} \leq y^* \leq y_{max}$, where $y_{min}$ and $y_{max}$ respectively represent the minimum and maximum constraints (e.g., "bounds") of measured variables. The term $$\min_{y^*} \sum_{i=1}^{n} \left(\frac{y_i^* - y_i}{\sigma_i}\right)^2$$

can also be referred to as the "penalty" of the measurement i.

In embodiments, the processor 920 will perform data reconciliation to minimize the overall correction (sum of all penalty terms) to satisfy the system constraints. For example, with reference to FIG. 6, the production network 600 includes four measurement nodes at Well 1, Well 2, Well 3 and Well 4 using three types of measurement meters. In the illustrated example of FIG. 6, Well 1 includes a multiphase flow meter (MPFM) 602, Well 3 and Well 4 include virtual meters 604 and 606, and Well 2 includes a watercut (WC) meter 608. Meters 602, 604, 606 and 608 measures the fluid flow with an associated tolerance shown in the table 609. The processor 920 will reconcile measured data and minimize the penalty within uncertainty constraints. For example, it will be noted that the reconciled sum 610 of all flows Q from all wells in the production network 600 is 13,970 Standard Barrels per day (STb/d), e.g., whereas the tank measures 13,500 STb/d at 612. In other words, reconciled flows 614 total a different number than measured flows 616. In some embodiments, when the reconciled sum 610 is different from the measured Q value 612, operators may be notified that instrumentation, for example meters 602, 604, 606 and 608, should be calibrated or replaced.

Figure 7:
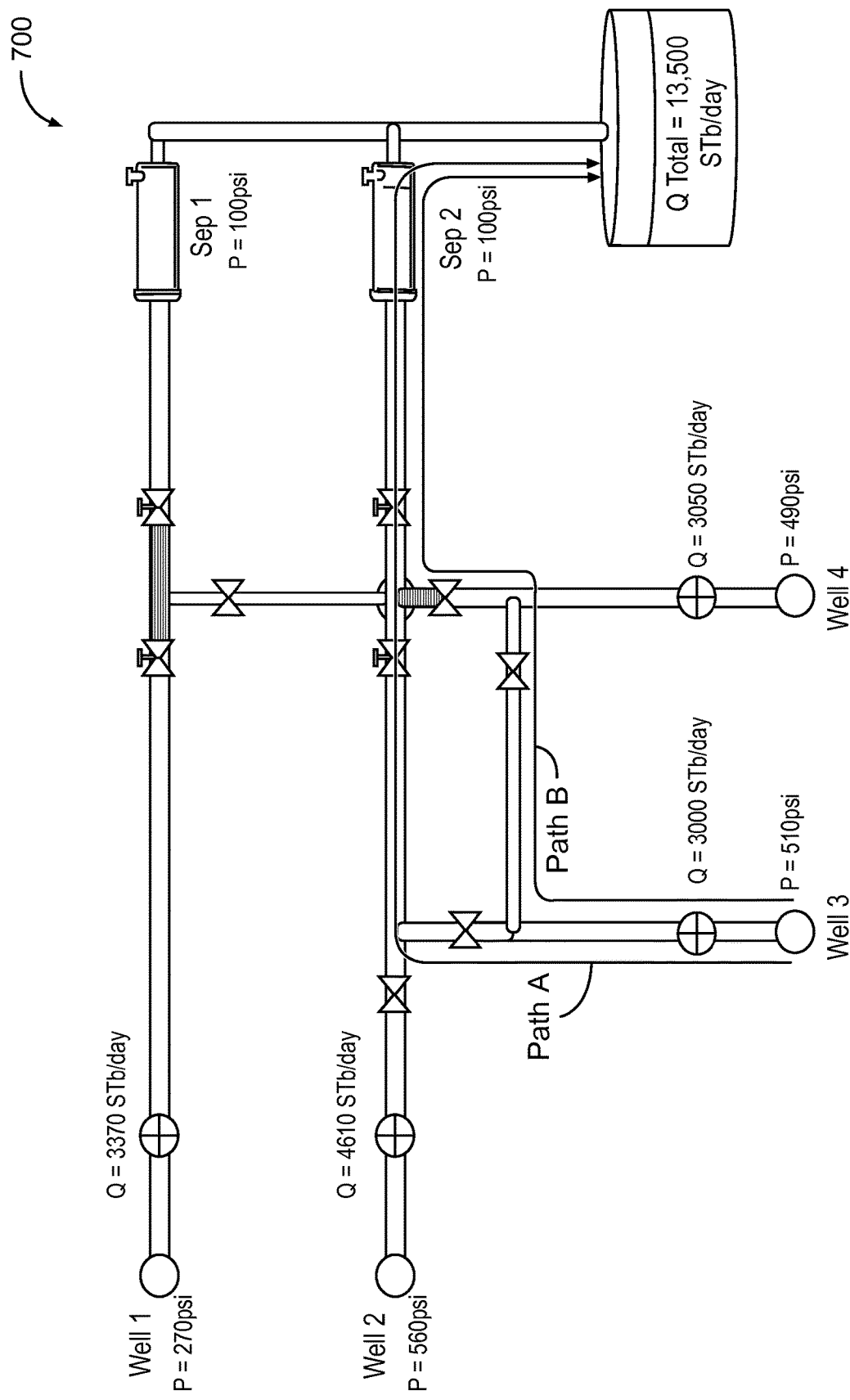
FIG. 7 illustrates flow path adjustment in accordance with various embodiments.

FIG. 7 illustrates flow path adjustment performed in accordance with various embodiments. As illustrated in FIG. 7, different pathways can be taken through a production network system 700. The processor 920 can select these different pathways to balance or enhance operations in the production network system 700. For example, at Well 3, the fluids may begin by going through Path A to the illustrated storage tank via Sep 2. The processor 920 can determine the different pathways (e.g., Path A and Path B) that converge at a node, or the processor 920 can receive information regarding predetermined pathways, for example. The processor 920 may later calculate Path B that offers better production performance and less operational risk than the original Path A by bypassing bottlenecks or blocked valves, etc.

Figure 8:
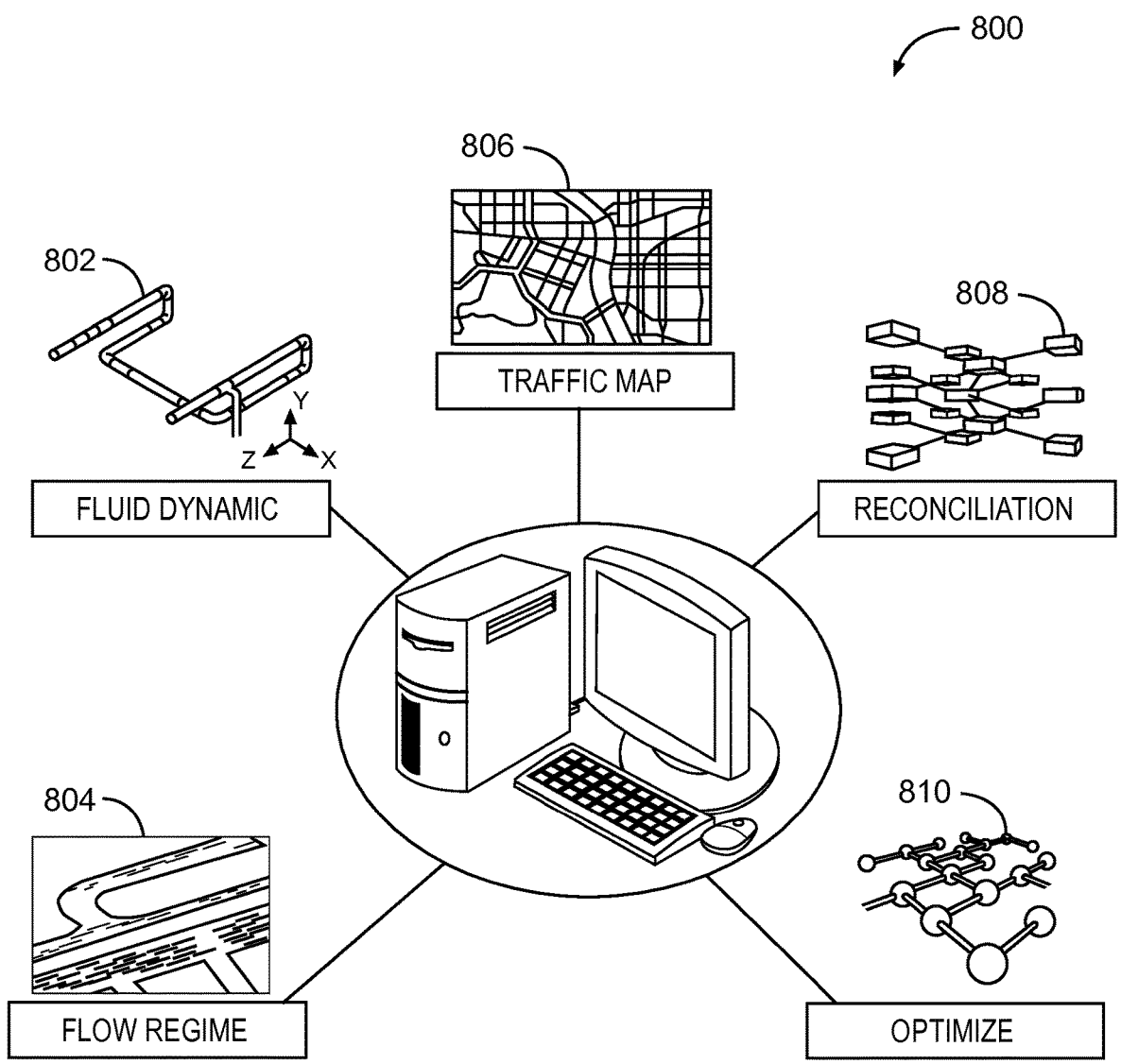
FIG. 8 illustrates a system including various components as can be used for improving or enhancing management of a production network system.

FIG. 8 illustrates a system 800 including various components as can be used for improving or enhancing management of a production network system. The system 800 can include a fluid dynamics module 802. The fluid dynamics module 802 can model surface systems 100 to update and model current production settings, to optimize choke settings, to manage bottlenecks, to improve distribution of available volumes of gas and water for gas lift and water injection, and to monitor and manage optimal pipe line pressure, by way of nonlimiting example.

The system 800 can further include a flow regime module 804 to determine different flow regimes as described earlier herein with reference to operation 206 (FIG. 2) and FIG. 5. The flow regime module 804 will determine flow regimes as part of identifying velocity and pressure profiles across the surface system 100 to identify areas with turbulent or chaotic flow that generate high vibrations, corrosion, erosion, etc. In some embodiments, these flow regimes can be shown graphically in dynamic form as described above with reference to FIG. 5 using a method in accordance with various embodiments based on superficial fluid velocity.

The system 800 can further include a traffic map module 806 to provide visualization of the surface system 100 using traffic light color codes (not shown in the Figures) as described earlier herein with reference to FIG. 4.

The system 800 can further include a data reconciliation module 808 to perform statistical optimization that uses real time data from wellheads, manifolds, separators and tanks to reconcile the surface system 100 as described earlier herein with reference to FIG. 6 and Equation (4).

The system 800 can further include a network path optimization module 810, to perform operations described earlier herein with reference to FIG. 2. Taken separately or together, operators can use components of the system 800 to manage production network systems.

FIG. 9 depicts a block diagram of features of a system 900 in accordance with various embodiments. The system 900 can provide a recommendation for improved or optimized paths through a surface system 100 refinement of measurement data related to measured parameters as described above. Additionally, the system 900 can provide any other functionality described above with reference to FIGS. 1-8.

The system 900 can include a production network modeling platform 905. As described earlier herein, embodiments can include GAP, available from Petroleum Experts of Houston, Tex., as the production network modeling platform 905, although embodiments are not limited thereto.

The system includes a processor 920. The production network modeling platform 905 can execute on the processor 920 or on another processor (not shown in FIG. 9) of the system 900. The processor 920 can provide information to the production network modeling platform 905, in addition to receiving information from the production network modeling platform 905.

The system 900 can additionally include a controller 925 and a memory 935. The controller 925 can operate to provide geographic coordinates to control measurement tools 960 to obtain refined measurement data based on the geographic coordinates as described herein, or the system 900 can provide these coordinates to another system (not shown in FIG. 9) for controlling a measurement instrument. The measurement tools 960 can include multiphase fluid meters (MPFMs), watercut meters, virtual meters, or other meters described earlier herein, or the measurement tools 960 can further include or alternatively include downhole measurement tools, logging tools, etc. The memory 935 can store measurement data for one or more of the parameters related to the network path optimization operations or other operations. The processor 920 can access the measurement data to perform any of the operations described herein. The memory 935 can further store data related the measurement tools 960, for example predicted error information of the measurement tools 960, although embodiments are not limited thereto.

The communications unit 940 can provide surface communications with wellheads, valves, manifolds, remote operator sites, etc., in measurement and control operations. Such surface communications can include wired and wireless systems. Additionally, the communications unit 940 can provide downhole communications in a measurement operation, although such downhole communications can also be provided by any other system located at or near measurement coordinates of a surface of the Earth where measurement will take place. Such downhole communications can include a telemetry system.

The system 900 can also include a bus 927, where the bus 927 provides electrical conductivity among the components of the system 900. The bus 927 can include an address bus, a data bus, and a control bus, each independently configured. The bus 927 can also use common conductive lines for providing one or more of address, data, or control, and the controller 925 can regulate usage of these lines. The bus 927 can include instrumentality for a communication network. The bus 927 can be configured such that the components of the system 900 are distributed. Such distribution can be arranged between surface components, downhole components and components that can be disposed on the surface of a well. Alternatively, various ones of these components can be co-located, such as on one or more collars of a drill string or on a wireline structure.

In various embodiments, the system 900 comprises peripheral devices 945 that can include displays, user input devices, additional storage memory, and control devices that may operate in conjunction with the controller 925 or the memory 935. For example, the peripheral devices 945 can include a user input device to receive user input responsive to providing example GUI screens for displaying information similar to that described above with reference to FIGS. 1, 3-6, and 8.

In an embodiment, the controller 925 can be realized as one or more processors. The peripheral devices 945 can be programmed to operate in conjunction with display unit(s) 955 with instructions stored in the memory 935 to implement a GUI to manage the operation of components distributed within the system 900. A GUI can operate in conjunction with the communications unit 940 and the bus 927.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 935 in the form of read only memory (ROM), random access memory (RAM), a magnetic disk storage device, an optical storage device, a flash memory, and other electronic, magnetic, or optical memory devices, including combinations thereof.

One or more processors such as, for example, the processor 920, can operate on the physical structure of such instructions. Executing these instructions determined by the physical structures can cause the machine to perform operations to receive parameters for a first node of a network, the network including a plurality of segments through which an object is to be routed and a plurality of nodes, including the first node, representative of intersections of two or more segments of the plurality of segments; to generate segment lengths for segments between the first node and neighboring nodes of the plurality of nodes to identify a nearest neighboring node with a shortest segment length relative to the first node; and to repeat operations of receiving parameters, generating segment lengths, and identifying nearest neighboring nodes until a route has been identified between a first endpoint and a second endpoint of the network.

The instructions can include instructions to cause the processor 920 to perform any of, or a portion of the above-described operations in parallel with performance of any other portion of the above-described operations. The processor 920 can store, in memory 935, any or all of the data received from the production network modeling platform or from measurement tools 960.

Upon reading and comprehending the content of this disclosure, one of ordinary skill in the art will understand the manner in which a software program can be launched from a computer-readable medium in a computer-based system to execute the functions defined in the software program, to perform the methods described herein. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C.

The software components may communicate using any of a number of mechanisms well known to those of ordinary skill in the art, such as application program interfaces or inter-process communication techniques, including remote procedure calls. Furthermore, software components can communicate with databases, for example relational databases, using SQL stored procedures, etc. The teachings of various embodiments are not limited to any particular programming language or environment. Thus, other embodiments may be realized.

Various Example Embodiments

For example, referring now to FIGS. 1-9, it can be seen that in some embodiments, a method comprises receiving parameters for a first node of a network, the network including a plurality of segments through which an object is to be routed and a plurality of nodes, including the first node, representative of intersections of two or more segments of the plurality of segments; generating segment lengths for segments between the first node and neighboring nodes of the plurality of nodes to identify a nearest neighboring node with a shortest segment length relative to the first node; and repeating operations of receiving parameters, generating segment lengths, and identifying nearest neighboring nodes until a route has been identified between a first endpoint and a second endpoint of the network.

In some embodiments, the object to be routed comprises crude oil or natural gas.

In some embodiments, the route has been identified when segment lengths have been generated based on each node of the plurality of nodes.

In some embodiments, a method comprises generating segment lengths by generating, based on the parameters, weights between the first node and neighboring nodes of the first node; and generating the segment lengths based on the weights.

In some embodiments, the parameters include a list of neighboring nodes, relative to the first node; a pressure difference between the first node and each neighboring node of the list; a flow regime for each segment of the plurality of segments, wherein the flow regime is determined based on a Reynolds number corresponding to each segment; and a length and diameter for each segment of the plurality of segments.

In some embodiments, generating the weights includes calculating a least square root (LSQR) of the parameters.

In some embodiments, a method comprises performing the opera ions of the method upon detection of an error condition in the network.

In some embodiments, the error condition includes one of a reduced flow rate, or a change in flow regime in a segment of the network, and a method comprises generating an alarm indication upon detection of the error condition.

In some embodiments, the first endpoint comprises a wellhead and the second endpoint comprises a storage unit.

In some embodiments, the route includes a list of nodes between the wellhead and the storage unit.

In some embodiments, a method comprises generating a visual display of the network, wherein the visual display includes a representation of the route.

In some embodiments, a method comprises providing a control signal to control an element of the network based on the route.

Some embodiments take the form of a system. Thus, in some embodiments, a system comprises one or more processors to receive parameters for a first node of a network, the network including a plurality of segments through which an object is to be routed and a plurality of nodes, including the first node, representative of intersections of two or more segments of the plurality of segments; generate segment lengths for segments between the first node and neighboring nodes of the plurality of nodes to identify a nearest neighboring node with a shortest segment length relative to the first node; and repeat operations of receiving parameters, generating segment lengths, and identifying nearest neighboring nodes until a route has been identified between a first endpoint and a second endpoint of the network. The system further may comprise memory to store parameters for the first node of the network, and parameters to define the route, and the system can further comprise valves to receive control signals based on the route.

In some embodiments, a system can include a display to display a graphical user interface (GUI) including GUI elements representative of the route.

In some embodiments, a system can include a notification module to notify of an error condition in the network and to initiate operations of receiving parameters, generating segment lengths, and identifying nearest neighboring nodes to generate an updated route responsive to detection of the error condition.

Some embodiments take the form of a non-transitory computer readable storage device having instructions stored thereon which, when performed by a machine, cause the machine to perform operations of any of the embodiments described above.

The above-described embodiments can allow oil and gas producers to increase and enhance utilization of wells and gathering networks, to enhance productivity of engineers and operators, to increase production, and to improve economic returns, by calculating a least-cost route between a wellhead and storage facility, among other improvements.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A computer-implemented method comprising:
monitoring, by a computer system, a flow of fluid through a pipeline network, the pipeline network comprising a plurality of nodes, wherein each node in the plurality of nodes is connected to two or more pipe segments of the pipeline network;
detecting, by the computer system, an error condition in a pipe segment of the pipeline network along a first path between a first endpoint and a second endpoint of the pipeline network, based on the monitoring;
responsive to the detection of the error condition, obtaining, by the computer system from measurement devices associated with one or more of the plurality of nodes in the pipeline network, parameters for at least one of the plurality of nodes connected to the pipe segment associated with the detected error condition and parameters for one or more neighboring nodes connected to other pipe segments that are also connected to the at least one node;

generating segment lengths for the other pipe segments connected to the at least one node and the one or more neighboring nodes, based on the obtained parameters;

identifying a nearest neighboring node from the one or more neighboring nodes of the at least one node, based on the generated segment lengths of the other pipe segments, wherein the nearest neighboring node is connected to one of the other pipe segments that is determined to have a shortest of the generated segment lengths;

determining a second path for the fluid to flow between the first and second endpoints of the pipeline network and circumvent the pipe segment associated with the error condition, based on the identified nearest neighboring node of the at least one node; and adjusting the flow of the fluid through the pipeline network according to the second path.

2. The method of claim 1, wherein the fluid comprises hydrocarbon-based fluids.

3. The method of claim 1, wherein the pipeline network includes one or more valves between the first and second endpoints, and wherein the adjusting comprises controlling the one or more valves to route the fluid through the pipeline network according to the second path.

4. The method of claim 1, wherein generating segment lengths comprises:
generating, based on the parameters, weights between the at least one node and the one or more neighboring nodes; and
generating the segment lengths based on the weights.

5. The method of claim 1, wherein the parameters include:
a list of the one or more neighboring nodes of the at least one node;
a pressure difference between the at least one node and each of the one or more neighboring nodes of the list;
a flow regime for each pipe segment between the first and second endpoints of the pipeline network, wherein the flow regime is determined based on a Reynolds number; and
a length and diameter for each pipe segment between the first and second endpoints of the pipeline network.

6. The method of claim 4, wherein generating the weights includes calculating a least square root (LSQR) of the parameters.

7. The method of claim 1, wherein the error condition includes at least one of a reduced flow rate or a change in flow regime in the pipe segment associated with the error condition.

8. The method of claim 7, wherein the method further includes generating an alarm indication upon detection of the error condition.

9. The method of claim 1, wherein the first endpoint comprises a wellhead and the second endpoint comprises a storage unit, and the fluid flows from the wellhead to the storage unit.

10. The method of claim 9, wherein each of the first and second paths includes a plurality of nodes between the wellhead and the storage unit.

11. The method of claim 1, further comprising:
generating a visual display of the pipeline network, wherein the visual display includes a representation of the first and second paths of the fluid through the pipeline network.

12. The method of claim 1, further comprising:
providing a control signal to control an element of the pipeline network and adjust the flow of the fluid based on the second path.

13. A system comprising:
one or more processors; and
a memory coupled to the one or more processors and storing processor-executable instructions, which, when executed by the one or more processors, cause the one or more processors to perform a plurality of operations, including operations to:
monitor a flow of fluid along a first path through a pipeline network between a first endpoint and a second endpoint of the pipeline network, the pipeline network comprising a plurality of nodes, wherein each node in the plurality of nodes is connected to two or more pipe segments of the pipeline network;
detect an error condition in a pipe segment between the first and second endpoints of the pipeline network, based on the monitoring;
obtain, from measurement devices associated with one or more of the plurality of nodes in the pipeline network, parameters for at least one of the plurality of nodes connected to the pipe segment and parameters for one or more neighboring nodes connected to other pipe segments that are also connected to the at least one node;
generate segment lengths for the other pipe segments connected to the at least one node and the one or more neighboring nodes, based on the obtained parameters;
identify a nearest neighboring node from the one or more neighboring nodes of the at least one node, based on the generated segment lengths of the other pipe segments, wherein the nearest neighboring node is connected to one of the other pipe segments that is determined to have a shortest of the generated segment lengths;
determine a second path for the fluid to flow between the first and second endpoints of the pipeline network and circumvent the pipe segment associated with the error condition, based on the identified nearest neighboring node of the at least one node; and
provide control signals to control valves in the pipeline network in order to route the fluid through the pipeline network based on the second path.

14. The system of claim 13, further comprising a display to display a graphical user interface (GUI) including GUI elements representative of the flow of the fluid through the pipeline network.

15. The system of claim 13, wherein the operations performed by the one or more processors further comprise operations to:
generate a notification that notifies a user of the error condition in the pipeline network,
wherein the operations to generate the notification, obtain the parameters, generate the segment lengths, and identify the nearest neighboring nodes are performed responsive to the detection of the error condition.

16. A non-transitory computer-readable storage medium having instructions stored thereon which, when executed by a computer, cause the computer to perform operations, the operations comprising:
monitoring a flow of fluid through a pipeline network, the pipeline network comprising a plurality of nodes, wherein each node in the plurality of nodes is connected to two or more pipe segments of the pipeline network;
detecting an error condition in a pipe segment of the pipeline network along a first path between a first endpoint and a second endpoint of the pipeline network, based on the monitoring;

obtaining, from measurement devices associated with one or more of the plurality of nodes in the pipeline network, parameters for at least one of the plurality of nodes connected to the pipe segment associated with the detected error condition and parameters for one or more neighboring nodes connected to other pipe segments that are also connected to the at least one node;

generating segment lengths for the other pipe segments connected to the at least one node and the one or more neighboring nodes, based on the obtained parameters;

identifying a nearest neighboring node from the one or more of the neighboring nodes of the at least one node, based on the generated segment lengths of the other pipe segments, wherein the nearest neighboring node is connected to one of the other pipe segments that is determined to have a shortest of the generated segment lengths;

determining a second path for the fluid to flow between the first and second endpoints of the pipeline network and circumvent the pipe segment associated with the error condition, based on the identified nearest neighboring node of the at least one node; and adjusting the flow of the fluid through the pipeline network according to the second path.

17. The non-transitory computer-readable storage medium of claim 16, wherein the operations performed by the computer further include operations comprising:
generating, based on the parameters, weights between the at least one node and the one or more neighboring nodes; and
generating the segment lengths based on the weights.

18. The non-transitory computer-readable storage medium of claim 17, wherein generating the weights includes calculating a least square root (LSQR) of the parameters.

19. The non-transitory computer-readable storage medium of claim 16, wherein the operations performed by the computer further include operations comprising:
responsive to detecting the error condition in the pipeline network, initiating the operations determining the second path as an updated route for the fluid to flow between the first and second endpoints of the pipeline network.

20. The non-transitory computer-readable storage medium of claim 19, wherein the error condition includes at least one of a reduced flow rate or a change in flow regime in the pipe segment associated with the error condition.

* * * * *